United States Patent
Henderson et al.

(10) Patent No.: US 12,397,797 B2
(45) Date of Patent: Aug. 26, 2025

(54) METHOD FOR DETERMINING A SLIP LIMIT VALUE FOR A WHEEL OF A VEHICLE

(71) Applicant: VOLVO TRUCK CORPORATION, Gothenburg (SE)

(72) Inventors: Leon Henderson, Härryda (SE); Leo Laine, Härryda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 150 days.

(21) Appl. No.: 18/553,435

(22) PCT Filed: Mar. 30, 2021

(86) PCT No.: PCT/EP2021/058294
§ 371 (c)(1),
(2) Date: Sep. 29, 2023

(87) PCT Pub. No.: WO2022/207080
PCT Pub. Date: Oct. 6, 2022

(65) Prior Publication Data
US 2024/0182036 A1   Jun. 6, 2024

(51) Int. Cl.
*B60W 30/18* (2012.01)

(52) U.S. Cl.
CPC ... *B60W 30/18172* (2013.01); *B60W 2520/06* (2013.01); *B60W 2520/10* (2013.01);
(Continued)

(58) Field of Classification Search
CPC ......... B60W 30/18172; B60W 2552/30; B60T 8/17616; B60T 8/172; B60T 2201/16
See application file for complete search history.

(56) References Cited

U.S. PATENT DOCUMENTS

| 5,328,255 A | * | 7/1994 | Isella | B60T 8/1755 |
| | | | | 701/91 |
| 5,564,800 A | * | 10/1996 | Fischle | B60T 8/1755 |
| | | | | 303/140 |

(Continued)

FOREIGN PATENT DOCUMENTS

| EP | 1844996 A1 | 10/2007 |
| GB | 2243657 A | 11/1991 |

(Continued)

OTHER PUBLICATIONS

International Search Report and Written Opinion of the International Searching Authority in corresponding International Application No. PCT/EP2021/058294 mailed Nov. 26, 2021 (13 pages).

(Continued)

*Primary Examiner* — George C Jin
(74) *Attorney, Agent, or Firm* — Venable LLP; Jeffri A. Kaminski

(57) ABSTRACT

A method for determining a slip limit value for a wheel of a vehicle. The slip limit value is used for controlling the operation of the vehicle. The method comprises setting the slip limit value to be smaller than a high slip limit value for a majority of an operating time of the vehicle. The method also determines whether or not the vehicle assumes an infrequent manoeuvre condition in which the vehicle carries out an infrequent manoeuvre and/or or is predicted to carry out an infrequent manoeuvre within a predetermined time range, and in response to determining that the vehicle assumes the infrequent manoeuvre condition, setting the slip limit value to the high slip limit value.

25 Claims, 3 Drawing Sheets

(52) U.S. Cl.
CPC ... *B60W 2520/105* (2013.01); *B60W 2520/12* (2013.01); *B60W 2520/125* (2013.01); *B60W 2520/20* (2013.01); *B60W 2520/26* (2013.01); *B60W 2530/16* (2013.01); *B60W 2530/20* (2013.01); *B60W 2552/30* (2020.02)

(56) References Cited

U.S. PATENT DOCUMENTS

| | | | | |
|---|---|---|---|---|
| 6,269,690 | B1* | 8/2001 | Shimizu | G01N 3/56 |
| | | | | 73/146 |
| 2003/0014177 | A1* | 1/2003 | Herb | B60K 28/16 |
| | | | | 701/82 |
| 2009/0037053 | A1* | 2/2009 | Yamazaki | B60W 10/14 |
| | | | | 701/41 |
| 2010/0174454 | A1* | 7/2010 | Saito | F16D 31/02 |
| | | | | 701/50 |
| 2010/0332071 | A1 | 12/2010 | Kato | |
| 2014/0297146 | A1* | 10/2014 | Murakami | B60K 23/0808 |
| | | | | 701/69 |
| 2022/0161801 | A1* | 5/2022 | Arikere | B60W 10/08 |
| 2023/0060578 | A1* | 3/2023 | Singh | B60C 23/0408 |
| 2024/0198986 | A1* | 6/2024 | Krause | B60K 28/16 |

FOREIGN PATENT DOCUMENTS

| | | |
|---|---|---|
| WO | 2014027058 A1 | 2/2014 |
| WO | 2017215751 A1 | 12/2017 |
| WO | 2020249239 A1 | 12/2020 |

OTHER PUBLICATIONS

International Preliminary Report on Patentability in corresponding International Application No. PCT/EP2021/058294 mailed Nov. 26, 2021 (7 pages).

* cited by examiner

METHOD FOR DETERMINING A SLIP LIMIT VALUE FOR A WHEEL OF A VEHICLE

CROSS-REFERENCE TO RELATED APPLICATIONS

This application is a U.S. National Stage application of PCT/EP2021/058294, filed Mar. 30, 2021 and published on Oct. 6, 2022, as WO 2022/207080, all of which is hereby incorporated by reference in its entirety.

TECHNICAL FIELD

The present invention relates to a method for determining a slip limit value for a wheel of a vehicle. Moreover, the present invention relates to a method for controlling the operation of a vehicle. Further, the present invention relates to a control unit for a vehicle. Additionally, the present invention relates to a control assembly for a vehicle. Furthermore, the present invention relates to a vehicle.

BACKGROUND OF THE INVENTION

When controlling the motion of a vehicle, it may be desirable to gain information as regards slip limit values for one or more wheels of the vehicle. For instance, a slip limit value may be used as a constraint for a wheel slip when deciding how to control the vehicle.

Purely by way of example, slip limit values may be useful when controlling braking, steering and/or propelling of a vehicle.

SUMMARY OF THE INVENTION

In view of the above, an object of the present invention is to provide a method for determining a slip limit value for a wheel of a vehicle, which method provides appropriate slip limit values.

As such, the present invention relates to a method for determining a slip limit value for a wheel of a vehicle. The slip limit value is used for controlling the operation of the vehicle. The method comprises setting the slip limit value to be smaller than a high slip limit value for a majority of an operating time of the vehicle.

The method further comprises:
determining whether or not the vehicle assumes an infrequent manoeuvre condition in which the vehicle carries out an infrequent manoeuvre and/or or is predicted to carry out an infrequent manoeuvre within a predetermined time range,
in response to determining that the vehicle assumes the infrequent manoeuvre condition, setting the slip limit value to the high slip limit value.

The above method implies that moderate levels may be used for the slip limit value during normal or frequent operations of the vehicle. The use of such moderate levels may be beneficial since continued operation of a vehicle under high slip limit values may result in less desired effects of the vehicle control, such as increased wheel wear rate and/or increased rolling resistance.

Optionally, the method further comprises determining a moderate slip limit value being smaller than the high slip limit value.

Optionally, the method further comprises:
in response to determining that the vehicle does not assume the infrequent manoeuvre condition, setting the slip limit value to a value lower than the high slip limit value.

Optionally, the method further comprises:
in response to determining that the vehicle does not assume the infrequent manoeuvre condition, setting the slip limit value to the moderate slip limit value.

The above features further imply that the slip limit value is kept appropriately low during a large portion of the operating time of the vehicle.

Optionally, the wheel has a longitudinal extension in a longitudinal direction extending in a direction transversal to an axis of rotation of the wheel. The slip limit value relates to a slip in the longitudinal direction.

Optionally, the wheel has a longitudinal extension in a longitudinal direction extending in a direction transversal to an axis of rotation of the wheel and a lateral extension in a lateral direction being parallel to the axis of rotation of the wheel. The slip limit value relates to a slip angle being determined using a longitudinal velocity of the wheel in the longitudinal direction and a lateral velocity of the wheel in the lateral direction.

Optionally, the moderate slip limit value is determined so as to correspond to a predetermined allowable rolling resistance associated with the wheel. This implies that the vehicle is operated under conditions with appropriate rolling resistance during a large portion of the operating time of the vehicle. This in turn indicates an appropriate energy, e.g. fuel, economy for the vehicle.

Optionally, the moderate slip limit value is determined so as to correspond to a predetermined allowable wear rate associated with the wheel. This implies that the vehicle is operated under a condition with an appropriately low wheel wear rate during a large portion of the operating time of the vehicle.

Optionally, the wheel comprises a tyre and the allowable wear rate is an allowable tyre wear rate of the tyre.

Optionally, the high slip limit value is set such that a high slip limit range from zero slip to the high slip limit value is obtained within which an increase in slip will always result in an increase in available wheel-to-ground horizontal force.

Optionally, determining whether or not the vehicle assumes an infrequent manoeuvre condition in which the vehicle carries out an infrequent manoeuvre and/or or is predicted to carry out an infrequent manoeuvre within a predetermined time range comprises determining that at least one of the following parameters exceeds a threshold value or is predicted to exceed the threshold value within the predetermined time range:
lateral acceleration,
longitudinal acceleration,
steering angle, and
path curvature.

Optionally, determining whether or not the vehicle assumes an infrequent manoeuvre condition comprises the following:
predicting an intended drive scenario for the vehicle,
in response to detecting that the intended drive scenario cannot be followed unless the slip limit value for the wheel is greater than the moderate slip limit value, determining that the vehicle assumes an infrequent manoeuvre condition.

Optionally, a ratio between the moderate slip limit value and the high slip limit value is less than 80%, preferably less than 70%.

A second aspect of the present invention relates to a method for controlling the operation of a vehicle. The vehicle comprises a wheel having a wheel slip value indicative of a measured and/or a predicted slip of the wheel. The method comprises:
  determining the slip limit value in accordance with any one of the above-recited steps and
  operating the vehicle using the slip limit value as a constraint for the wheel slip value.

Optionally, the method comprises operating the vehicle such that the wheel slip value does not exceed the slip limit value.

A third aspect of the present invention relates to a control unit for a vehicle. The control unit is adapted to determine a slip limit value for a wheel of a vehicle. The slip limit value is used for controlling the operation of the vehicle. The control unit is adapted to set the slip limit value to be smaller than a high slip limit value for a majority of an operating time of the vehicle. The control unit is adapted to:
  receive information relating to the vehicle and therefrom determine whether or not the vehicle assumes an infrequent manoeuvre condition in which the vehicle carries out an infrequent manoeuvre and/or or is predicted to carry out an infrequent manoeuvre within a predetermined time range, and
  in response to determining that the vehicle assumes the infrequent manoeuvre condition, set the slip limit value to the high slip limit value.

Optionally, the control unit further is adapted to determine a moderate slip limit value being smaller than the high slip limit value.

Optionally, the control unit further is adapted to:
  in response to determining that the vehicle does not assume the infrequent manoeuvre condition, set the slip limit value to a value lower than the high slip limit value.

Optionally, the control unit further is adapted to:
  in response to determining that the vehicle does not assume the infrequent manoeuvre condition, set the slip limit value to the moderate slip limit value.

Optionally, the wheel has a longitudinal extension in a longitudinal direction extending in a direction transversal to an axis of rotation of the wheel. The slip limit value relates to a slip in the longitudinal direction.

Optionally, the wheel has a longitudinal extension in a longitudinal direction extending in a direction transversal to an axis of rotation of the wheel and a lateral extension in a lateral direction being parallel to the axis of rotation of the wheel. The slip limit value relates to a slip angle being determined using a longitudinal velocity of the wheel in the longitudinal direction and a lateral velocity of the wheel in the lateral direction.

Optionally, the control unit is adapted to determine the moderate slip limit value so as to correspond to a predetermined allowable rolling resistance associated with the wheel.

Optionally, the control unit is adapted to determine the moderate slip limit value so as to correspond to a predetermined allowable wear rate associated with the wheel.

Optionally, the wheel comprises a tyre and the allowable wear rate is an allowable tyre wear rate of the tyre.

Optionally, the control unit is adapted to set the high slip limit value such that a high slip limit range from zero slip to the high slip limit value is obtained within which an increase in slip will always result in an increase in available wheel-to-ground horizontal force.

Optionally, the control unit is adapted to determine whether or not the vehicle assumes an infrequent manoeuvre condition in which the vehicle carries out an infrequent manoeuvre and/or or is predicted to carry out an infrequent manoeuvre within a predetermined time range by determining that at least one of the following parameters exceeds a threshold value or is predicted to exceed the threshold value within the predetermined time range:
  lateral acceleration,
  longitudinal acceleration,
  steering angle, and
  path curvature.

Optionally, the control unit is adapted to determine whether or not the vehicle assumes an infrequent manoeuvre condition by a procedure comprising the following:
  predicting an intended drive scenario for the vehicle,
  in response to detecting that the intended drive scenario cannot be followed unless the slip limit value for the wheel is greater than the moderate slip limit value, determining that the vehicle assumes the infrequent manoeuvre condition.

Optionally, a ratio between said moderate slip limit value and said high slip limit value is less than 80%, preferably less than 70%.

A fourth aspect of the present invention relates to a control assembly for a vehicle, the control assembly comprising the control unit according to the third aspect of the present invention. The vehicle comprises a wheel having a wheel slip value indicative of a measured and/or a predicted slip of the wheel. The control assembly is adapted to:
  determine the slip limit value using the control unit according to the third aspect of the present invention and
  issue one or more control signals to the vehicle in order to control the wheel using the slip limit value as a constraint for the wheel slip value.

Optionally, the control assembly is adapted to issue one or more control signals to the vehicle in order to control the wheel such that the wheel slip value does not exceed the slip limit value.

A fifth aspect of the present invention relates to a vehicle comprising a control unit according to the third aspect of the present invention and/or a control assembly according to the fourth aspect of the present invention.

BRIEF DESCRIPTION OF THE DRAWINGS

With reference to the appended drawings, below follows a more detailed description of embodiments of the invention cited as examples.

In the drawings.

DETAILED DESCRIPTION OF PREFERRED EMBODIMENTS

The invention will be described below for a vehicle in the form of a truck 10 such as the truck illustrated in FIG. 1. The truck 10 should be seen as an example of a vehicle which could comprise a control unit according to the present invention.

However, the present invention may be implemented in a plurality of different types of vehicles. Purely by way of example, the present invention could be implemented in a truck, a tractor, a car, a bus, a work machine such as a wheel loader or any other type of construction equipment.

Moreover, the vehicle 10 has a longitudinal extension in a longitudinal direction x being parallel to an intended direction of travel and a lateral extension in a lateral direction y being perpendicular to the longitudinal direction. Furthermore, as indicated in FIG. 1, the vehicle 10 also has a vertical extension in a vertical direction z and the lateral direction y is perpendicular to each one of the longitudinal direction x and the vertical direction z.

Figure 1:
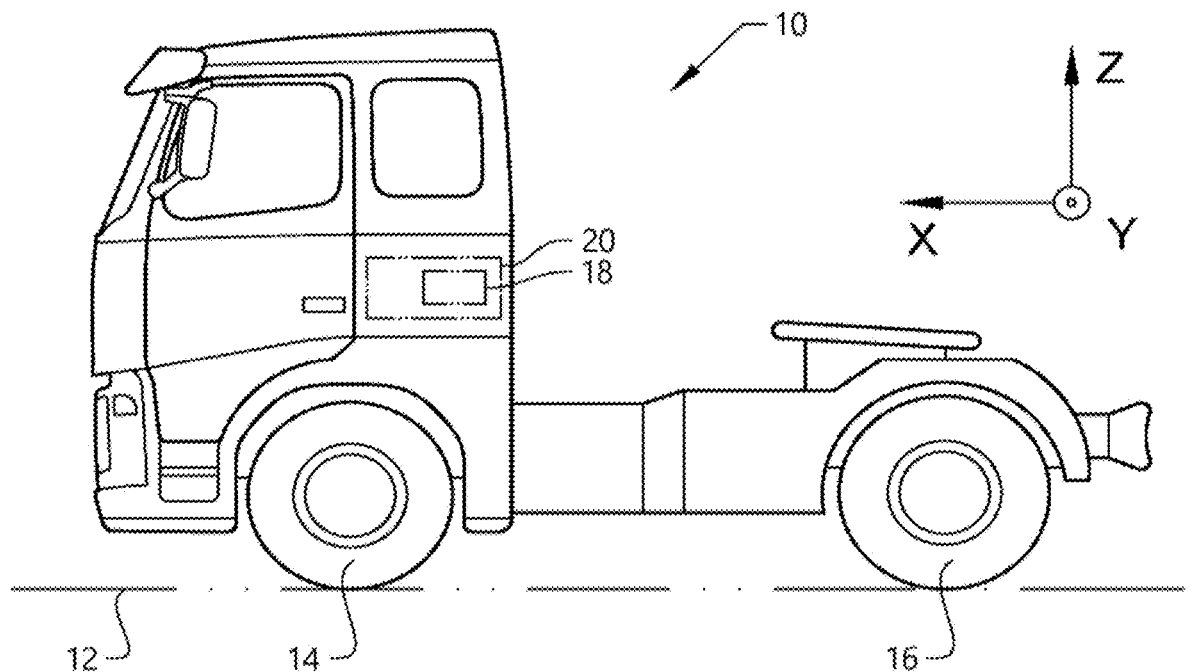
FIG. 1 is a schematic view of a vehicle.

A vehicle is generally adapted to be supported by a ground surface 12 and also generally comprises a plurality of wheels, which is exemplified in FIG. 1 by two wheels 14, 16. When the vehicle is moving relative to the ground surface 12, a slip is generally obtained between each one of the wheels 14, 16 and the ground surface 12.

A slip may be regarded as a relative motion between a wheel 14, 16 and the ground surface 12 it is moving on. Such a slip may be expressed in terms of a longitudinal slip and/or a lateral slip.

For instance, a longitudinal slip may be regarded a parameter indicative of the relative longitudinal motion between the wheel of the vehicle and the ground surface thereof, i.e. the amount of "skidding".

As such, the wheel 14, 16 may have a longitudinal extension in a longitudinal direction x extending in a direction transversal to an axis of rotation (not shown) of the wheel 14, 16. Consequently, when the wheel 14, 16 is in a position for travelling straight ahead (and assuming that the wheel 14, 16 does not assume a toe-in or toe-out condition for instance), the longitudinal direction x of the wheel 14, 16 is essentially parallel to the longitudinal direction x of the vehicle 10. The slip limit value $s_{x,lim}$ may relate to a slip in the longitudinal direction x of the wheel 14, 16.

Purely by way of example, a parameter $s_x$ indicative of a slip in the longitudinal direction x of the wheel 14, 16 may be defined in accordance with the following:

$$s_x = \frac{R\omega - v_x}{|R\omega|}$$

where R denotes the radius of the wheel, ω denotes the angular velocity of the wheel and $v_x$ denotes the longitudinal speed of the wheel, which longitudinal speed generally is related to the longitudinal speed of the centre of the wheel.

Alternatively, or in addition, to the above, the wheel 14, 16 has a longitudinal extension in a longitudinal direction x extending in a direction transversal to an axis of rotation (not shown) of the wheel and a lateral extension in a lateral direction y is parallel to the axis of rotation of the wheel 14, 16. Consequently, when the wheel 14, 16 is in a position for travelling straight ahead, the lateral direction y of the wheel 14, 16 is parallel to the lateral direction y of the vehicle 10. The slip limit value relating to a slip angle $\alpha_{lim}$ may be determined using a longitudinal velocity $v_x$ of the wheel 14, 16 in the longitudinal direction x of the wheel and a lateral velocity $v_y$ of the wheel 14, 16 in the lateral direction y of the wheel.

As such, a slip in the lateral direction y may be expressed in terms of a slip angle α in accordance with the following:

$$\alpha = \arctan\left(\frac{v_y}{|v_x|}\right)$$

where $v_x$ denotes the longitudinal speed of the wheel and $v_y$ denotes the lateral speed of the wheel.

Figure 2:
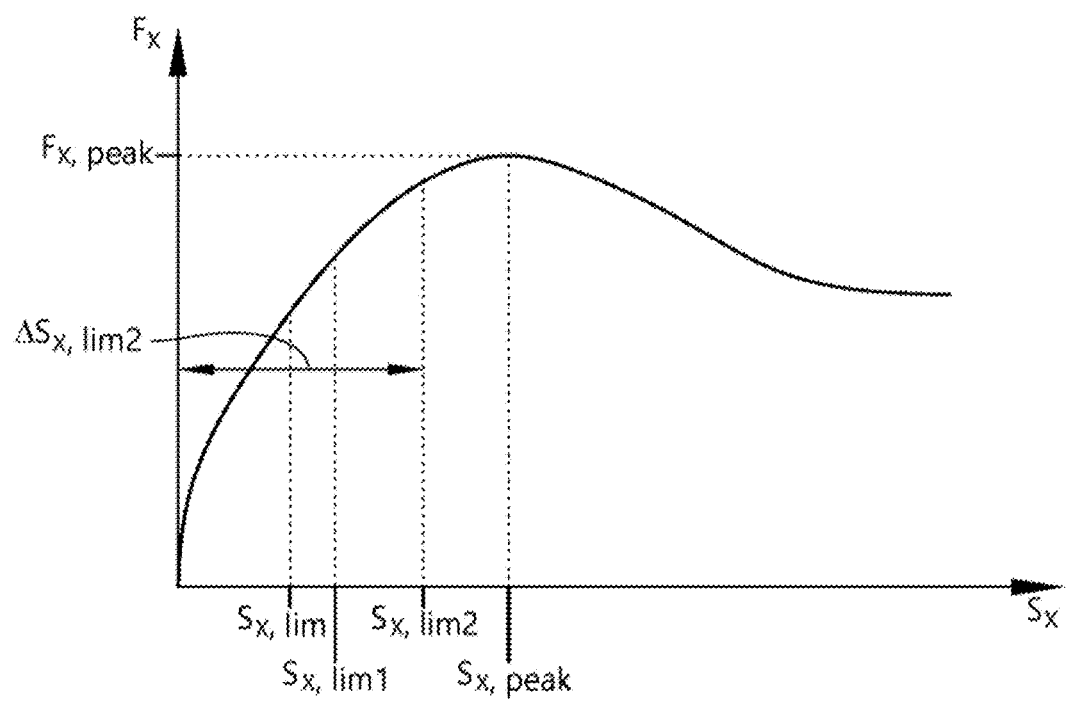
FIG. 2 is a schematic diagram of a wheel force as a function of wheel slip.

FIG. 2 illustrates a relation between a longitudinal wheel force $F_x$ obtainable from a wheel as a function of the slip $s_x$ in the longitudinal direction x. As may be gleaned from FIG. 2, the obtainable longitudinal wheel force $F_x$ increases with an increased slip $s_x$ from the origin of the FIG. 2 diagram to a peak value $F_{x,peak}$ at a peak slip value $s_{x,peak}$ whereafter the longitudinal wheel force $F_x$ decreases with a further increase of the slip $s_x$.

Although the FIG. 2 diagram is schematic, it may be realized therefrom that when the slip is below though close to the peak slip value $s_{x,peak}$, relatively large longitudinal wheel forces $F_x$ are obtainable which in turn may facilitate the control of the vehicle 10. Purely by way of example, relatively large longitudinal wheel forces $F_x$ may imply that the vehicle can be braked, propelled and or steered in an expedient manner. For the sake of completeness, it should be noted that a vehicle 10 may be operated at slip values even exceeding the peak slip value $s_{x,peak}$.

However, what the inventors of the present invention have realized is that the operation of the vehicle 10 at a slip value being close to the peak slip value $s_{x,peak}$ may be associated with disadvantages. Purely by way of example, such disadvantages may include undesirably high wear rate of the wheels and/or an undesirable high rolling resistance of one or more wheels of the vehicle. As such, it has been realized that it may be beneficial to operate the vehicle at relatively low slip values unless when there is a strong need to increase the forces obtainable from the wheels.

Reverting to FIG. 1, as indicated therein, the vehicle 10 may comprise a control unit 18. Purely by way of example, the control unit 18 may form part of a control assembly 20 although it is also envisaged that embodiments of the vehicle 10 may comprise a control unit 18 without any associated control assembly 20.

The control unit 18 is adapted to determine a slip limit value $s_{x,lim}$; $\alpha_{lim}$ for a wheel 14, 16 of a vehicle 10 and features of the control unit 18 related thereto are presented hereinbelow, although it should be noted that the below presentation of the control unit 18 is equally applicable to a method for determining a slip limit value $s_{x,lim}$; $\alpha_{lim}$.

In the below example, the slip limit value is exemplified by a limit value $s_{x,lim}$ for a slip in the longitudinal direction x or a limit value $\alpha_{lim}$ for a slip in the lateral direction y. However, it is also envisaged that the control unit 18, or the method, of the present invention may use another type of slip value and consequently of the slip limit value.

As such, the control unit 18 is adapted to determine a slip limit value $s_{x,lim}$; $\alpha_{lim}$ for a wheel 14, 16 of a vehicle 10. The slip limit value $s_{x,lim}$; $\alpha_{lim}$ is used for controlling the operation of the vehicle 10. Purely by way of example, and as will be elaborated on hereinbelow, the operation of the vehicle 10 may be controlled using the control assembly 20.

Again with reference to FIG. 2 and using the limit value $s_{x,lim}$ for a slip in the longitudinal direction x as an example, the control unit 18 is adapted to determine a slip limit value $s_{x,lim}$ for a wheel 14, 16 of a vehicle 10. The slip limit value $s_{x,lim}$ is used for controlling the operation of the vehicle 10.

The control unit 18 is adapted to set the slip limit value $s_{x,lim}$ to be smaller than a high slip limit value $s_{x,lim2}$ for a majority of an operating time of the vehicle 10. Purely by way of example, the term "majority of an operating time" may relate to at least 50%, preferably at least 70%, more preferred at least 90%, of the operating time of the vehicle 10. In the example in FIG. 2, the set slip limit value $s_{x,lim}$ is illustrated as being rather low in order to elucidate the difference between the set slip limit value $s_{x,lim}$ and the high slip limit value $s_{x,lim2}$.

Furthermore, the control unit 18 is adapted to:
receive information relating to the vehicle 10 and therefrom determine whether or not the vehicle assumes an infrequent manoeuvre condition in which the vehicle 10 carries out an infrequent manoeuvre and/or or is predicted to carry out an infrequent manoeuvre within a predetermined time range, and
in response to determining that the vehicle assumes the infrequent manoeuvre condition, set the slip limit value $s_{x,lim}$; $\alpha_{lim}$ to the high slip limit value $s_{x,lim2}$, $\alpha_{lim2}$.

As such, by virtue of the control unit 18 and/or the method according to the present invention, the high slip limit value $s_{x,lim2}$, $\alpha_{lim2}$ may be used, preferably may only be used, under certain conditions in which it is deemed necessary to have relatively large wheel forces, e.g. longitudinal wheel forces, available for a current and/or predicted manoeuvre condition.

Purely by way of example, the control unit 18 may further be adapted to determine a moderate slip limit value $s_{x,lim1}$ which is smaller than the high slip limit value $s_{x,lim2}$.

Otherwise, e.g. under less severe manoeuvre conditions, a value lower than the high slip limit value may be used. As such, in embodiments of the invention, the control unit 18 may further be adapted to:
in response to determining that the vehicle does not assume the infrequent manoeuvre condition, set the slip limit value $s_{x,lim}$ to a value lower than the high slip limit value $s_{x,lim2}$, preferably to the moderate slip limit value $s_{x,lim1}$.

Furthermore, as indicated in FIG. 2, the control unit 18 may be adapted to set the high slip limit value $s_{x,lim2}$ such that a high slip limit range $\Delta s_{x,lim2}$ from zero slip to the high slip limit value $s_{x,lim2}$ is obtained within which an increase in slip $s_x$ will always result in an increase in available wheel-to-ground horizontal force $F_x$.

The above-mentioned moderate slip limit value $s_{x,lim1}$ may be determined in a plurality of different ways as will be elaborated on hereinbelow. However, irrespective of how the moderate slip limit value $s_{x,lim}$ is determined, the moderate slip limit value $s_{x,lim1}$ may preferably be such that a ratio between the moderate slip limit value $s_{x,lim1}$ and the high slip limit value $s_{x,lim2}$ is less than 80%, preferably less than 70%.

Figure 3:
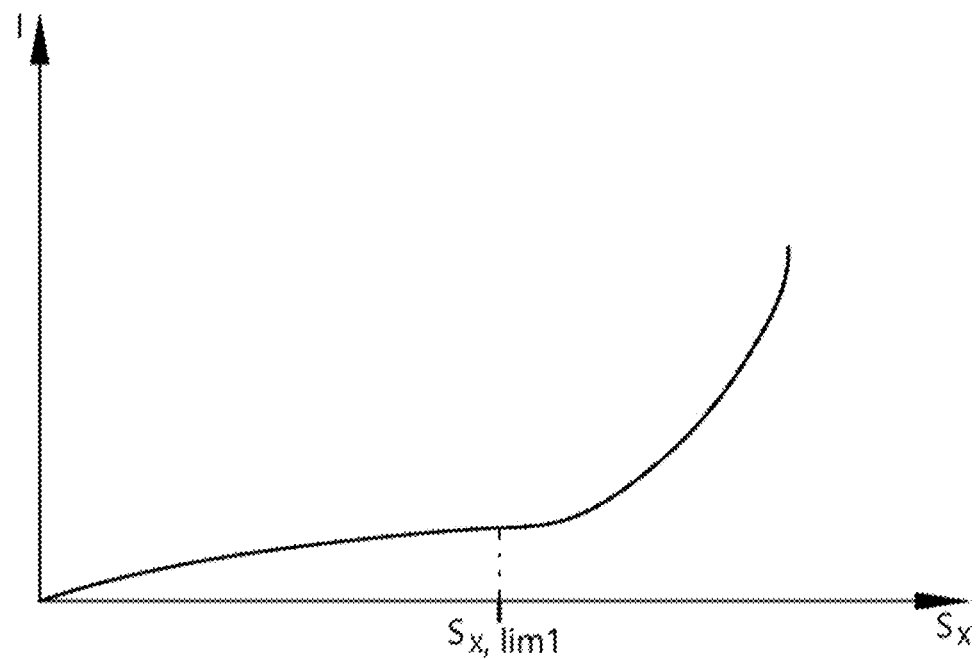
FIG. 3 is a schematic diagram of wheel wear rate as a function of wheel slip.

FIG. 3 illustrates a diagram representing an amount of wheel wear rate I of a wheel as a function of the slip $s_x$ in the longitudinal direction x. Purely by way of example, the FIG. 3 diagram may be generated using a test procedure and/or using a theoretical model. Furthermore, the diagram indicated in FIG. 3 may be generated for certain conditions, such a certain tyre pressure (in the event that the wheel has a tyre), a certain normal force and a certain wheel camber angle.

As may be realized from FIG. 3, the wheel wear rate I increases with an increased value of the slip $s_x$ in the longitudinal direction x. Moreover, as indicated in FIG. 3, such a wear rate increase need not necessarily be linear. As such, it may be possible to select the moderate slip limit value $s_{x,lim1}$ such that an appropriately low wheel wear rate I is obtained when the vehicle is operated such that the slip for the wheel concerned is equal to or below the moderate slip limit value $s_{x,lim1}$.

Figure 4:
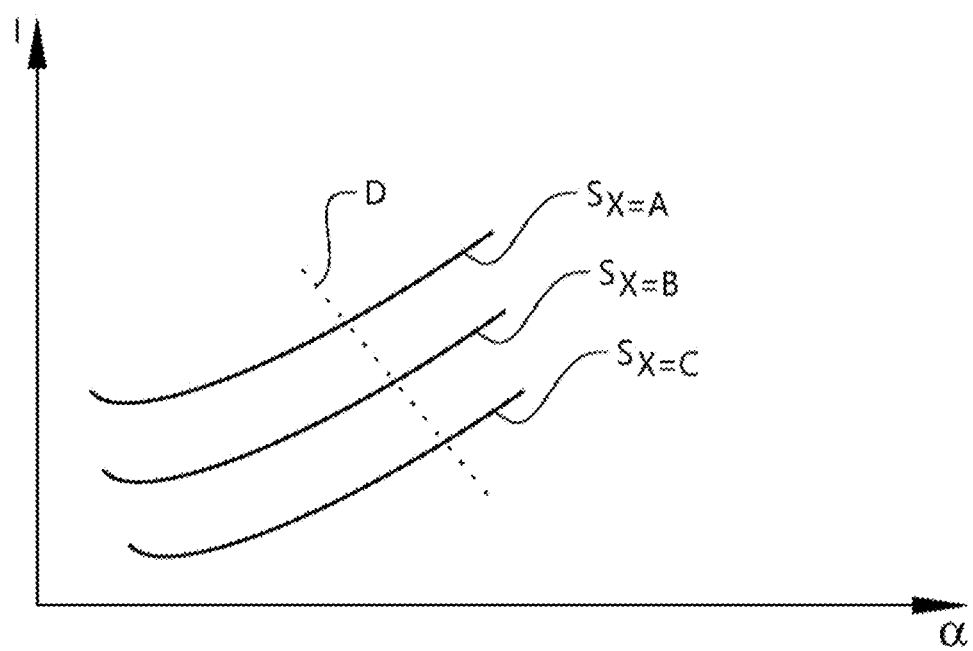
FIG. 4 is a schematic diagram of wheel wear rate as a function of slip angle.

FIG. 4 illustrates another diagram in which several functions of the wheel wear rate I of a wheel as a function of the slip angle $\alpha$ is presented for a plurality of different values ($s_x$=A, $s_x$=B, $s_x$=C) of the slip $s_x$ in the longitudinal direction x.

As for the FIG. 3 diagram, though purely by way of example, the FIG. 4 diagram may be generated using a test procedure and/or using a theoretical model. Furthermore, the diagram indicated in FIG. 4 may be generated for certain conditions, such a certain tyre pressure (in the event that the wheel has a tyre), a certain normal force, ambient and/or wheel temperature and a certain wheel camber angle. Furthermore, as indicated in FIG. 4, is may be possible to select one or more pairs $s_{x,lim1}$, $\alpha_{lim1}$ of moderate slip limit values for the limit value $s_{x,lim}$ for a slip in the longitudinal direction x and a limit value $\alpha_{lim}$ for a slip in the lateral direction y. As a non-limiting example, such pairs may be stored in a look-up table or the like.

Instead of, or in addition to, determining the moderate slip limit value $s_{x,lim1}$ on the basis of wheel wear rate I, the control unit 18 may be adapted to determine the moderate slip limit value $s_{x,lim1}$ so as to correspond to a predetermined allowable rolling resistance associated with the wheel.

In order to determine whether or not the vehicle assumes an infrequent manoeuvre condition in which the vehicle carries out an infrequent manoeuvre and/or or is predicted to carry out an infrequent manoeuvre within a predetermined time range, the control unit 18 may be adapted to determine that at least one of the following parameters exceeds a threshold value or is predicted to exceed the threshold value within the predetermined time range:
lateral acceleration,
longitudinal acceleration,
steering angle, and
path curvature.

Purely by way of example, the lateral acceleration indicated above may relate to the acceleration in the lateral direction y of the vehicle 10, see e.g. FIG. 1. In a similar vein, though purely by way of example, the longitudinal acceleration indicated above may relate to the acceleration in the longitudinal direction x of the vehicle 10, see e.g. FIG. 1.

As such, the control unit 18 may be adapted to receive one or more signals with information indicative of at least one of the above entities. To this end, the vehicle hosting the control unit 18 may comprise one or more sensors adapted to issue such signals.

Instead of, or in addition to, determining whether or not the vehicle assumes an infrequent manoeuvre condition using the above procedure, the control unit 18 may be adapted to determine whether or not the vehicle assumes an infrequent manoeuvre condition by a procedure comprising the following:
predicting an intended drive scenario for the vehicle (10),
in response to detecting that the intended drive scenario cannot be followed unless the slip limit value ($s_{x,lim}$; $\alpha_{lim}$) for the wheel (14, 16) is greater than the moderate slip limit value ($s_{x,lim1}$; $\alpha_{lim1}$), determining that the vehicle (10) assumes the infrequent manoeuvre condition.

As has been indicated above, the vehicle 10 may comprise a control assembly 20 comprising the control unit 18 presented above. Purely by way of example, the control assembly 20 may be adapted to control one or more wheels of the vehicle 10. As a non-limiting example, the control assembly 20 may be adapted to control at least one of braking, propulsion and steering of one or more wheels of the vehicle.

As such, and as indicated above, the vehicle 10 comprises a wheel (e.g. the front wheel 14 in FIG. 1) having a wheel slip value indicative of a measured and/or a predicted slip of the wheel 14. The control assembly 20 is adapted to:

- determine the slip limit value $s_{x,lim}$; $\alpha_{lim}$ using the control unit 18 according to the present invention, for instance a control unit 18 according to any one of the embodiments presented above, and
- issue one or more control signals to the vehicle 10 in order to control the wheel using the slip limit value as a constraint for the wheel slip value.

Preferably, the control assembly 20 is adapted to issue one or more control signals to the vehicle in order to control the wheel such that the wheel slip value $s_x$; $\alpha$ does not exceed the slip limit value $s_{x,lim}$; $\alpha_{lim}$.

As an alternative to ensuring that the wheel slip value $s_x$; $\alpha$ does not exceed the slip limit value $s_{x,lim}$; $\alpha_{lim}$, the slip limit value $s_{x,lim}$; $\alpha_{lim}$ may be used as a constraint for the wheel slip value $s_x$; $\alpha$ in other ways. Purely by way of example, the slip limit value $s_{x,lim}$; $\alpha_{lim}$ may be used in a penalty function when determining an appropriate wheel slip value $s_x$; $\alpha$.

Figure 5:
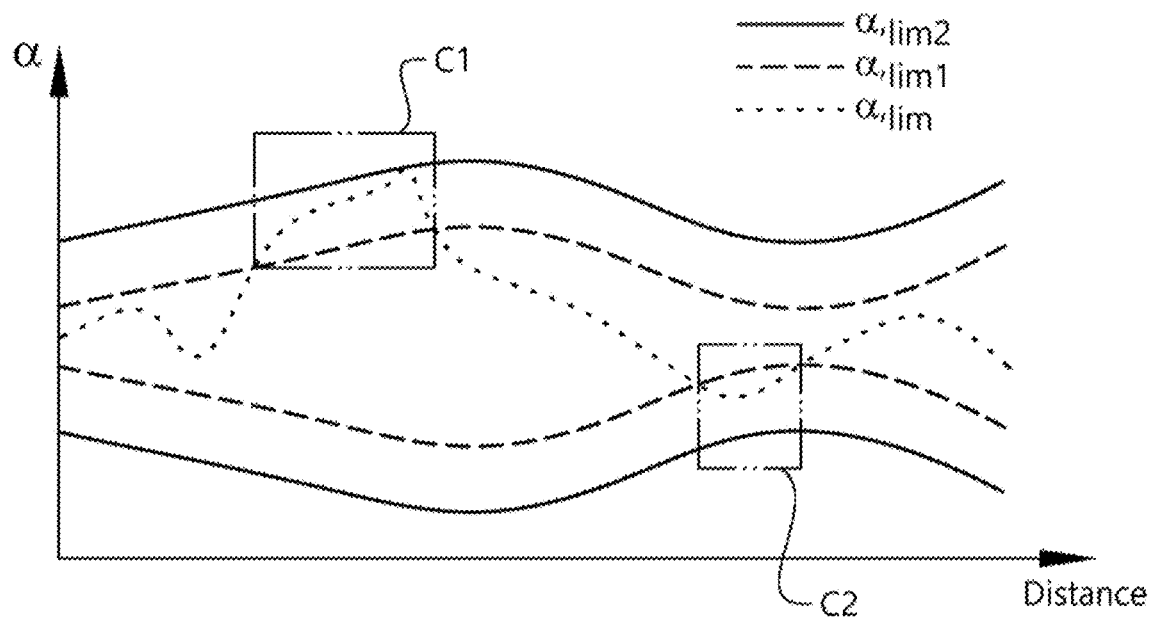
FIG. 5 is a schematic illustration of an implementation of the invention.
Figure 6:
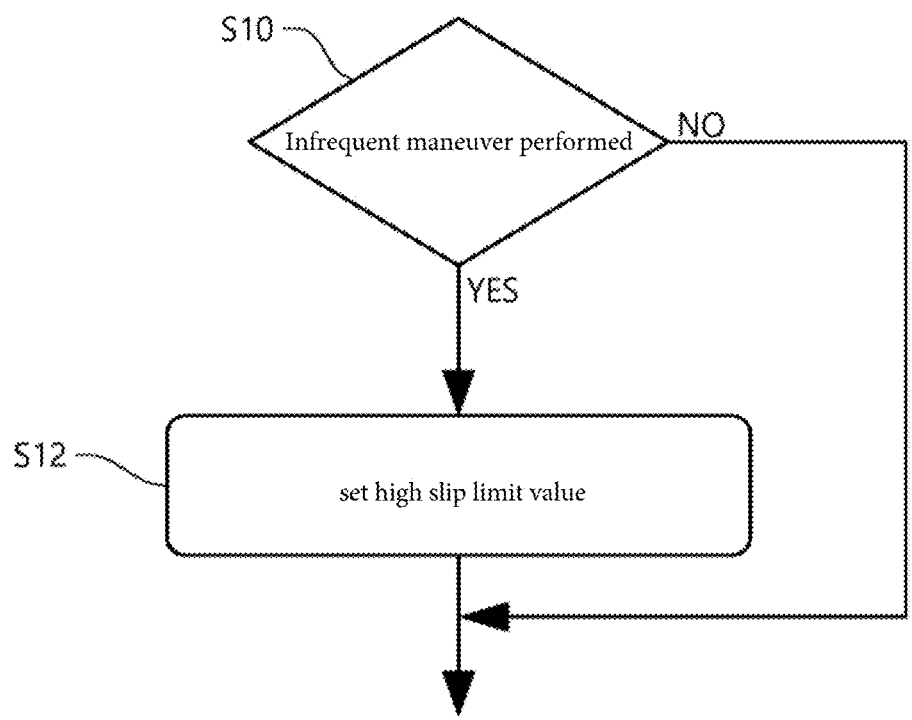
FIG. 6 is a flowchart illustrating an embodiment of the method of the invention.

The above operation of the control assembly 20 is exemplified in FIG. 5 and FIG. 6 illustrating how a slip limit value, exemplified as a limit value $\alpha_{lim}$ for a slip in the lateral direction y in FIG. 5, may vary as a vehicle (not shown in FIG. 5) travels a longitudinal distance. Moreover, FIG. 5 illustrates how the moderate slip limit value $\alpha_{lim1}$ and a high slip limit value $\alpha_{lim2}$ determined—preferably using the control unit 18—for different positions along the longitudinal direction. As such, though purely by way of example, the first and high slip limit value $\alpha_{lim1}$, $\alpha_{lim2}$ may be determined at various time instants, for instance on the basis of current or expected conditions of the concerned wheel and/or other portions of the vehicle. Here, it should also be noted that FIG. 6 illustrates a flow chart for a method of the present invention.

As indicated in FIG. 5, when controlling the vehicle, for instance using the control assembly 20, it is generally ensured that the limit value $\alpha_{lim}$ is equal to or lower that the moderate slip limit value $\alpha_{lim1}$. However, in certain conditions, illustrated by boxes C1 and C2, respectively, in FIG. 5, the vehicle assumes an infrequent manoeuvre condition in which the vehicle carries out an infrequent manoeuvre and/or or is predicted to carry out an infrequent manoeuvre within a predetermined time range. The features of determining whether or not said vehicle assumes an infrequent manoeuvre condition in which said vehicle carries out an infrequent manoeuvre and/or or is predicted to carry out an infrequent manoeuvre within a predetermined time range are illustrated by box S10 in the FIG. 6 flow chart.

When the vehicle assumes such an infrequent manoeuvre condition, e.g. when the result from an assessment in box S10 is yes (Y), the limit value $\alpha_{lim}$ is instead set to the high slip limit value $\alpha_{lim2}$. Such features are illustrated by box S12 in FIG. 6.

It is to be understood that the present invention is not limited to the embodiments described above and illustrated in the drawings; rather, the skilled person will recognize that many changes and modifications may be made within the scope of the appended claims.

The invention claimed is:

1. A method for determining a slip limit value for a wheel of a vehicle, said slip limit value being used for controlling the operation of said vehicle, said method comprising setting said slip limit value to be smaller than a high slip limit value for a majority of an operating time of said vehicle, said method further comprising:
   determining whether or not said vehicle assumes an infrequent manoeuvre condition in which said vehicle carries out an infrequent manoeuvre and/or or is predicted to carry out an infrequent manoeuvre within a predetermined time range, wherein determining whether or not said vehicle assumes an infrequent manoeuvre condition in which said vehicle carries out an infrequent manoeuvre and/or or is predicted to carry out an infrequent manoeuvre within a predetermined time range comprises determining that at least one of the following parameters exceeds a threshold value or is predicted to exceed said threshold value within said predetermined time range:
   lateral acceleration,
   longitudinal acceleration,
   steering angle, and
   path curvature,
   in response to determining that said vehicle assumes said infrequent manoeuvre condition, setting said slip limit value to said high slip limit value, and
   determining a moderate slip limit value being smaller than said high slip limit value, wherein said moderate slip limit value is determined so as to correspond to a predetermined allowable wear rate associated with said wheel.

2. The method according to claim 1, wherein said method further comprises:
   in response to determining that said vehicle does not assume said infrequent manoeuvre condition, setting said slip limit value to a value lower than said high slip limit value.

3. The method according to claim 1, wherein said method further comprises:
   in response to determining that said vehicle does not assume said infrequent manoeuvre condition, setting said slip limit value to said moderate slip limit value.

4. The method according to claim 1, wherein said wheel has a longitudinal extension in a longitudinal direction extending in a direction transversal to an axis of rotation of said wheel, said slip limit value relating to a slip in said longitudinal direction.

5. The method according to claim 1, wherein said wheel has a longitudinal extension in a longitudinal direction extending in a direction transversal to an axis of rotation of said wheel and a lateral extension in a lateral direction being parallel to said axis of rotation of said wheel, said slip limit value relating to a slip angle being determined using a longitudinal velocity of said wheel in said longitudinal direction and a lateral velocity of said wheel in said lateral direction.

6. The method according to claim 1, wherein said moderate slip limit value is determined so as to correspond to a predetermined allowable rolling resistance associated with said wheel.

7. The method according to claim 1, wherein said wheel comprises a tire and said allowable wear rate is an allowable tyre wear rate of said tire.

8. The method according to claim 1, wherein said high slip limit value is set such that a high slip limit range from zero slip to said high slip limit value is obtained within which an increase in slip will always result in an increase in available wheel-to-ground horizontal force.

9. The method according to claim 1, wherein determining whether or not said vehicle assumes an infrequent manoeuvre condition comprises the following:
predicting an intended drive scenario for said vehicle,
in response to detecting that said intended drive scenario cannot be followed unless said slip limit value for said wheel is greater than said moderate slip limit value, determining that said vehicle assumes an infrequent manoeuvre condition.

10. The method according to claim 1, wherein a ratio between said moderate slip limit value and said high slip limit value is less than 80%, preferably less than 70%.

11. A method for controlling the operation of a vehicle, said vehicle comprising a wheel having a wheel slip value indicative of a measured and/or a predicted slip of said wheel, wherein said method comprises:
determining said slip limit value in accordance with claim 1 and
operating said vehicle using said slip limit value as a constraint for said wheel slip value.

12. The method according to claim 11, wherein said method comprises operating said vehicle such that the wheel slip value does not exceed said slip limit value.

13. A control unit for a vehicle, said control unit being adapted to determine a slip limit value for a wheel of a vehicle, said slip limit value being used for controlling the operation of said vehicle, said control unit being adapted to set said slip limit value to be smaller than a high slip limit value for a majority of an operating time of said vehicle, said control unit being adapted to:
receive information relating to said vehicle and therefrom determine whether or not said vehicle assumes an infrequent manoeuvre condition in which said vehicle carries out an infrequent manoeuvre and/or or is predicted to carry out an infrequent manoeuvre within a predetermined time range, wherein said control unit is adapted to determine whether or not said vehicle assumes an infrequent manoeuvre condition in which said vehicle carries out an infrequent manoeuvre and/or or is predicted to carry out an infrequent manoeuvre within a predetermined time range by determining that at least one of the following parameters exceeds a threshold value or is predicted to exceed said threshold value within said predetermined time range:
lateral acceleration,
longitudinal acceleration,
steering angle, and
path curvature,
in response to determining that said vehicle assumes said infrequent manoeuvre condition, set said slip limit value to said high slip limit value, and
determine a moderate slip limit value being smaller than said high slip limit value, wherein said control unit is adapted to determine said moderate slip limit value so as to correspond to a predetermined allowable wear rate associated with said wheel.

14. The control unit according to claim 13, wherein said control unit further is adapted to:
in response to determining that said vehicle does not assume said infrequent manoeuvre condition, set said slip limit value to a slip limit value being smaller than said high slip limit value.

15. The control unit according to claim 13, wherein said control unit further is adapted to:
in response to determining that said vehicle does not assume said infrequent manoeuvre condition, set said slip limit value to said moderate slip limit value.

16. The control unit according to claim 13, wherein said wheel has a longitudinal extension in a longitudinal direction extending in a direction transversal to an axis of rotation of said wheel, said slip limit value relating to a slip in said longitudinal direction.

17. The control unit according to claim 13, wherein said wheel has a longitudinal extension in a longitudinal direction extending in a direction transversal to an axis of rotation of said wheel and a lateral extension in a lateral direction being parallel to said axis of rotation of said wheel, said slip limit value relating to a slip angle being determined using a longitudinal velocity of said wheel in said longitudinal direction and a lateral velocity of said wheel in said lateral direction.

18. The control unit according to claim 13, wherein said control unit is adapted to determine said moderate slip limit value so as to correspond to a predetermined allowable rolling resistance associated with said wheel.

19. The control unit according to claim 13, wherein said wheel comprises a tyre tire and said allowable wear rate is an allowable tire wear rate of said tyre.

20. The control unit according to claim 16, wherein said control unit is adapted to set said high slip limit value such that a high slip limit range from zero slip to said high slip limit value is obtained within which an increase in slip will always result in an increase in available wheel-to-ground horizontal force.

21. The control unit according to claim 13, wherein said control unit is adapted to determine whether or not said vehicle assumes an infrequent manoeuvre condition by a procedure comprising the following:
predicting an intended drive scenario for said vehicle,
in response to detecting that said intended drive scenario cannot be followed unless said slip limit value for said wheel is greater than said moderate slip limit value, determining that said vehicle assumes said infrequent manoeuvre condition.

22. The control unit according to claim 16, wherein a ratio between said moderate slip limit value and said high slip limit value is less than 80%, preferably less than 70%.

23. A control assembly for a vehicle, said control assembly comprising said control unit according to claim 16, said vehicle comprising a wheel having a wheel slip value indicative of a measured and/or a predicted slip of said wheel, said control assembly being adapted to:
determine said slip limit value using said control unit and issue one or more control signals to said vehicle in order to control said wheel using said slip limit value as a constraint for said wheel slip value.

24. The control assembly according to claim 23, where said control assembly is adapted to issue one or more control signals to said vehicle in order to control said wheel such that said wheel slip value does not exceed said slip limit value.

25. A vehicle comprising a control unit according to claim 13 and/or a control assembly.

* * * * *